(12) United States Patent
Hoji et al.

(10) Patent No.: US 7,717,690 B2
(45) Date of Patent: May 18, 2010

(54) GEAR PUMP

(75) Inventors: Takeshi Hoji, Tokyo (JP); Satoshi Nagao, Tokyo (JP); Keisuke Shinozaki, Tokyo (JP)

(73) Assignee: TBK Co., Ltd., Tokyo (JP)

( * ) Notice: Subject to any disclaimer, the term of this patent is extended or adjusted under 35 U.S.C. 154(b) by 284 days.

(21) Appl. No.: 11/612,044

(22) Filed: Dec. 18, 2006

(65) Prior Publication Data
US 2008/0044308 A1    Feb. 21, 2008

(30) Foreign Application Priority Data
Aug. 15, 2006    (JP) .............................. 2006-221581

(51) Int. Cl.
F01C 20/18    (2006.01)
(52) U.S. Cl. ........................................ 418/205; 418/21
(58) Field of Classification Search .................. 418/21, 418/205, 206.1
See application file for complete search history.

(56) References Cited

U.S. PATENT DOCUMENTS

| | | | | |
|---|---|---|---|---|
| 2,293,126 | A | * | 8/1942 | Fersing .......................... 418/21 |
| 2,665,641 | A | * | 1/1954 | Lauck ........................... 417/283 |
| 3,446,118 | A | * | 5/1969 | Tozaburo ....................... 417/274 |
| 4,740,142 | A | * | 4/1988 | Rohs et al. ....................... 418/21 |
| 5,306,127 | A | * | 4/1994 | Kinney .......................... 418/21 |
| 5,620,315 | A | * | 4/1997 | Pfuhler .......................... 418/21 |
| 6,283,735 | B1 | * | 9/2001 | Schreiber et al. .............. 418/21 |
| 7,137,798 | B2 | * | 11/2006 | Gotschhofer ............. 418/206.1 |
| 7,179,070 | B2 | * | 2/2007 | O'Brien, II ............... 418/206.1 |
| 7,195,467 | B2 | * | 3/2007 | Cadeddu ....................... 418/21 |

FOREIGN PATENT DOCUMENTS

| JP | 57-073880 | 5/1982 |
|---|---|---|
| JP | 2000-120559 | 4/2000 |

OTHER PUBLICATIONS

English Language Abstract of JP 2000-120559.
English Language Abstract of JP 57-073880.
U.S. Appl. No. 11/612,015 to Hoji et al., filed Dec. 18, 2006.

* cited by examiner

*Primary Examiner*—Thomas Denion
*Assistant Examiner*—Douglas J. Duff
(74) *Attorney, Agent, or Firm*—Greenblum & Bernstein, P.L.C.

(57) ABSTRACT

A casing with housing space for retaining a first gear and a second gear in a condition where the tooth tips and both side surfaces slide, comprises a main casing which retains the first gear in a manner which allows rotation but restricts movement in the axial direction, and a gear holder which can move in the rotating shaft direction in the main casing and which rotatably retains the second gear. The main casing contains a biasing member which applies a biasing force to bias the gear holder to one side in the rotating shaft direction, and a piston which is acted on by hydraulic pressure and presses the gear holder on the other end side in the rotating shaft direction to counteract the biasing force. The gear holder is acted on by the hydraulic force from the piston to counteract the bias from the biasing member and moves in the rotating shaft direction according to the hydraulic force so that the engagement width between the first gear and the second gear which is retained by the gear holder is changed.

4 Claims, 10 Drawing Sheets

GEAR PUMP

TECHNICAL FIELD

The present invention relates to a gear pump with a casing which maintains sliding contact between tooth tips and both side surfaces of a mutually engaged first gear and second gear, and more particularly relates to a gear pump constructed such that the width of engagement of the first gear and the second gear can be changed.

BACKGROUND OF THE INVENTION

The capacity of this type of gear pump is determined by the tooth depth and tooth width or the like, and the discharge flow rate is determined by the capacity and the rotational speed of the gear (pump rotational speed). If the gear pump is used for instance as an oil pump which supplies lubricating oil to an vehicle engine, the capacity of this oil pump is set such that the quantity of oil required for lubrication can be provided even when the output of the driving engine and the rotational speed of the pump are low. Therefore, if the engine output and the rotational speed of the pump increase, the discharge flow rate will be excessive compared to the required amount, the unadjusted high drive force will be consumed by the oil pump, which may lead to loss of engine output.

A known gear pump which resolves this problem is a variable capacity gear pump where one or both of the drive gear and the driven gear are moved in the axial direction in order to reduce the gear engagement width and the capacity as the pump rotational speed increases (for instance, Japanese Patent Application Laid Open No. 2000-120559 and S57-73880). The gear pump of patent application 2000-120559 has a construction where two side plates on either side in the axial direction of the driven gear are provided, the support shaft of the driven gear is supported by both side plates, a biasing force is applied to the back surface of one side plate, and a pressing force which counteracts the biasing force is applied to the back surface of the other side plate based on the discharge fluid pressure. Thereby the driven gear which is between the two side plates will move in the axial direction to a position which balances the pressing force and the biasing force such that the gear engagement width is changed based on the discharge fluid pressure.

Conventionally, when the pressing force and the biasing force are balanced and the driven gear is stopped, the pressing force and the biasing force will act on the side plates in opposing directions to the driven gear, and therefore the support shaft must support the resistance to the load based on the pressing force and the biasing force. Therefore when the pressing force and the biasing force increase such that the side plates cannot provide resistance to this load, the side plates will move relative to the support shaft and will directly push against the side surface of the driven gear, and thereby a large sliding resistance will occur between the driven gear and the side plate, and the mechanical efficiency of the pump may be reduced.

SUMMARY OF THE INVENTION

With the foregoing in view, it is an object of the present invention to provide a gear pump with a construction which can change the engagement width between a first gear and a second gear, and which can suppress reduction in the mechanical efficiency.

The gear pump of the present invention comprises a first gear (for example the drive gear 10 of the preferred embodiment) and a second gear (for instance the driven gear 20 of the preferred embodiment) which are established to rotate around parallel rotating shafts and to mutually engage, and a casing with a gap which maintains sliding contact between the tooth tips and both side surfaces of the first gear and the second gear, wherein an intake port which draws in oil and a discharge port which discharges oil based on the rotation of the first gear and the second gear are formed in a casing, said casing comprising a main casing which retains the first gear rotatably while restricting movement in the axial direction and a gear holder which moves in the rotating shaft direction within the main casing and retains the second gear rotatably. A biasing member which applies a biasing force to bias the gear holder to one side in the rotating shaft direction (for instance return spring 70 in the preferred embodiment) and a piston which receives hydraulic force and presses on the other side of the gear holder in the rotating shaft direction to counteract the biasing force are provided in the main casing. Furthermore, the gear holder receives hydraulic force from the piston to counteract the bias of the biasing material, and moves in the rotating shaft direction according to the hydraulic force, and therefore the engagement width between the first gear and the second gear, which is supported by the gear holder, is changed.

With this construction, the gear holder has a first side surface against which one of the two side surfaces of the second gear slides and an inner circumferential surface against which the tooth tips of the second gear slide, the piston is in contact with the gear holder and has a second side surface against which the other one of the two side surfaces of the second gear slides, one end of the shaft member which supports the second gear is supported by the piston, and the other end of the shaft member (for instance the driven side support shaft 25 of the preferred embodiment) is preferably supported by the gear holder. Furthermore, the side surface of the driven gear preferably has a recess formed in a part of the sliding region on at least one of the first side surface and the second side surface.

A construction is acceptable where an internal oil channel is formed in the main casing connecting the discharge port to an enclosed space formed on the back surface side of the piston, and the piston receives hydraulic force from the discharge oil pressure supplied to the enclosed space through the internal oil channel.

Preferably the piston has a cylindrical shape and is fitted into the main casing, the center of the outer circumferential surface and the center of the inner circumferential surface are eccentric, and a part of the outer circumferential surface is curved to match the tooth tips of the first gear. Alternatively, the piston may consist of a substantially disk-shaped flat plate part and a protruding part which protrudes in a cylindrical shape from the flat plate part and is fitted to the main casing, the center of the outer circumferential surface of the flat plate part and the center of the outer circumferential surface of the protrusion are eccentric, and a part of the outer circumferential surface of the flat plate part may be curved to match the tooth tips of the first gear.

With the gear pump of the present invention, the casing comprises a main casing which rotatably retains the first gear and restricts movement in the axial direction, and the gear holder which rotatably retains the second gear and can move freely in the rotating shaft direction in the main casing, a biasing member biases the gear holder to one side in the rotating shaft direction while the gear holder receives a hydraulic force to one side from the piston in the rotating shaft direction to counteract the bias from the biasing member, and the gear holder moves within the main casing in the rotating shaft direction according to this hydraulic force. In this manner, the gear holder is acted one by both a biasing force and a hydraulic force in mutually opposing directions, so the side surface of the second gear which is supported by the gear holder will not be pushed in the axial direction, and the interval between both side surfaces of the second gear and the surface against which that side surface slides will not change. Therefore the sliding resistance can be reduced and the mechanical efficiency of the gear pump can be increased.

Note that if the first side surface against which one side surface of the second gear slides and the inner circumferential surface against which the tooth tips of the second gear slide are provided in the gear holder, and the second side surface which contacts the gear holder and against which the other side of the second gear slides is established in the piston, the second gear which is supported by the shaft member can easily be attached to the gear holder and the piston. Furthermore, if a recess if formed in at least one of either the first side surface or the second side surface on the part of the region that slides against the second gear, the sliding resistance can positively be suppressed in the region where the recess is formed, and the mechanical efficiency of the gear pump can be further increased.

If an internal oil channel is formed to connect the discharge port with the enclosed space formed on the back surface side of the piston, oil discharged from the discharge port can be supplied to the enclosed space, and the pump capacity can be controlled based on the discharge oil pressure.

If the piston which is fitted into the main casing is formed with a cylindrical construction, the center axes of the outer circumferential surface and the inner circumferential surface are eccentric, and a part of the outer circumferential surface is curved to match the tooth tips of the first gear, the piston will be attached to the main casing in a manner that restricts rotation, and the piston movement will be stable. Similarly, if the piston which is fitted to the main casing has a flat plate and protrusion construction, the center axes of the outer circumferential surface of the flat plate part and the outer circumferential surface of the protrusion are mutually eccentric, and a part of the outer circumferential surface of the flat plate part is curved to match the tooth tips of the first gear, the piston will be attached to the main casing in a manner that restricts rotation, and the movement of the piston will be stable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

A preferred embodiment of the present invention will be described below while referring to the drawings. FIG. 1 through FIG. 5 show a first embodiment of an oil pump 1 as one example of the gear pump of the present invention. This oil pump 1 uses a vehicle engine not shown in the drawings as a drive source, draws in the lubricating oil which has accumulated in a tank provided in the vehicle (such as the engine oil pan), and discharges to a lubricating oil channel which is connected with various regions of the engine.

Figure 1:
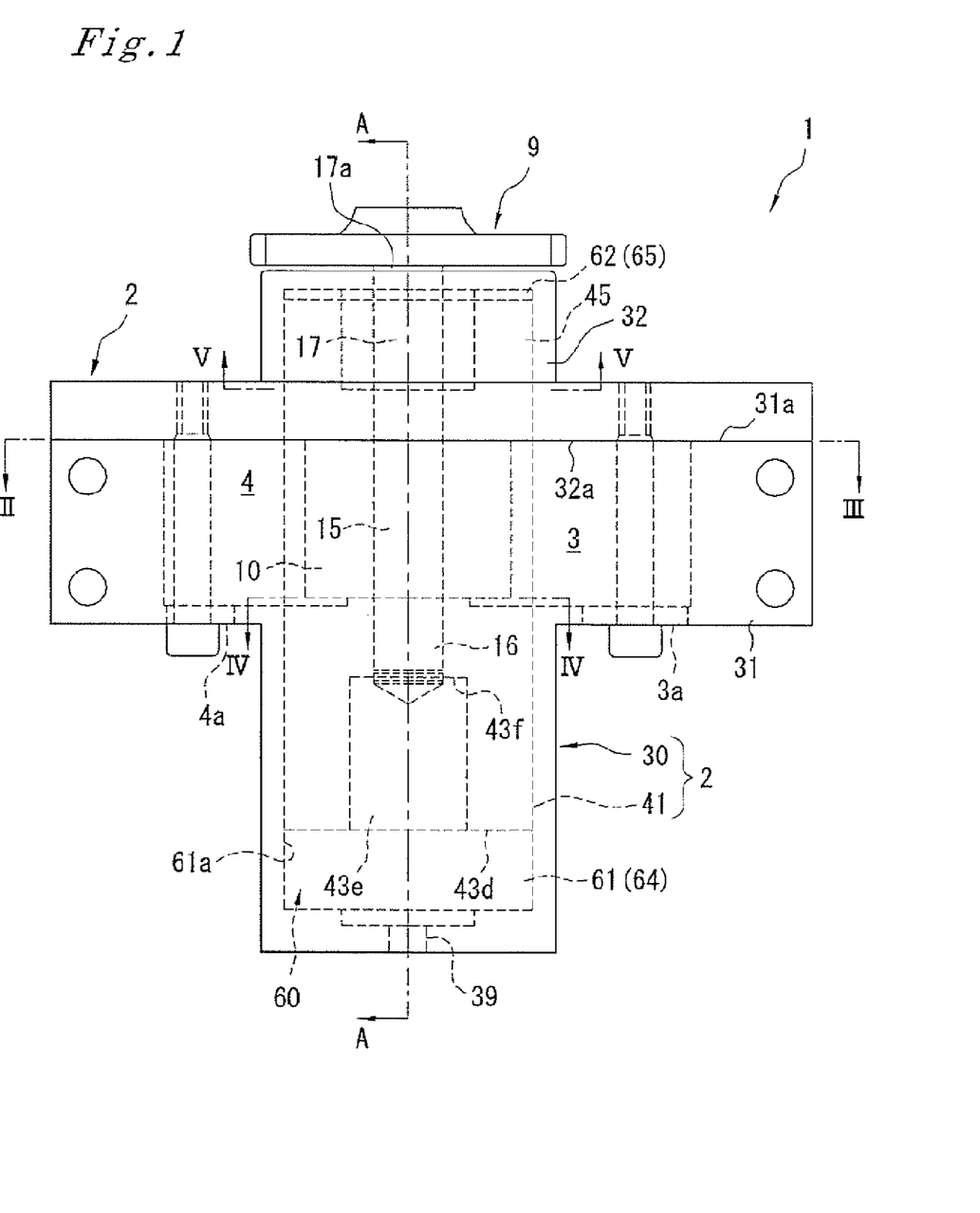
FIG. 1 is a top view diagram of a first embodiment of an oil pump showing an embodiment of the gear pump of the present invention.
Figure 2:
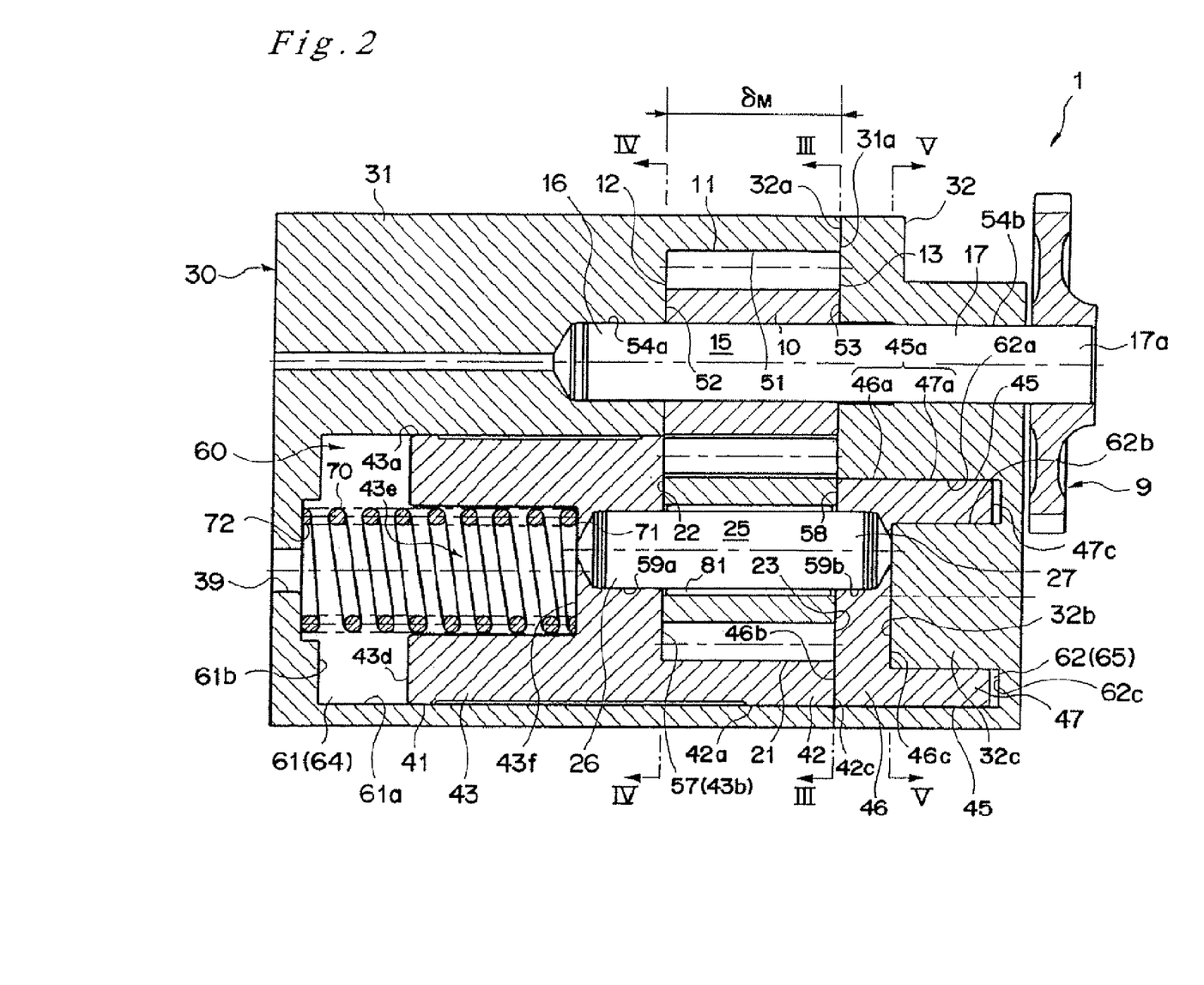
FIG. 2 is a side cross section diagram of the first embodiment of an oil pump as seen in the direction of arrow A-A in FIG. 1, showing the 6 initial condition of the oil pump.
Figure 3:
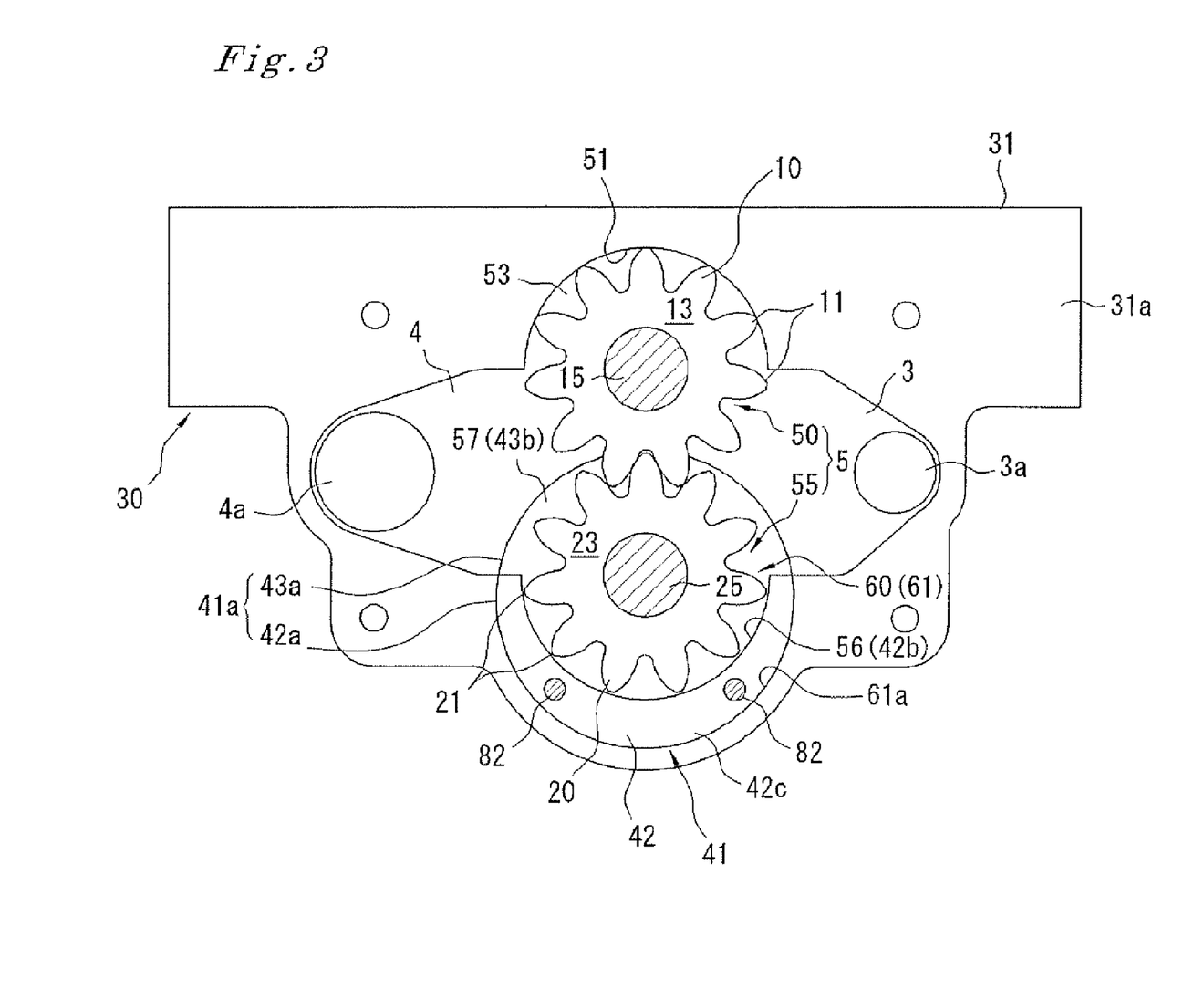
FIG. 3 is a cross section diagram of the first embodiment of an oil pump as seen in the direction of arrow III-III in FIG. 1 and FIG. 2, showing the back side view of the casing and the gear holder.
Figure 4:
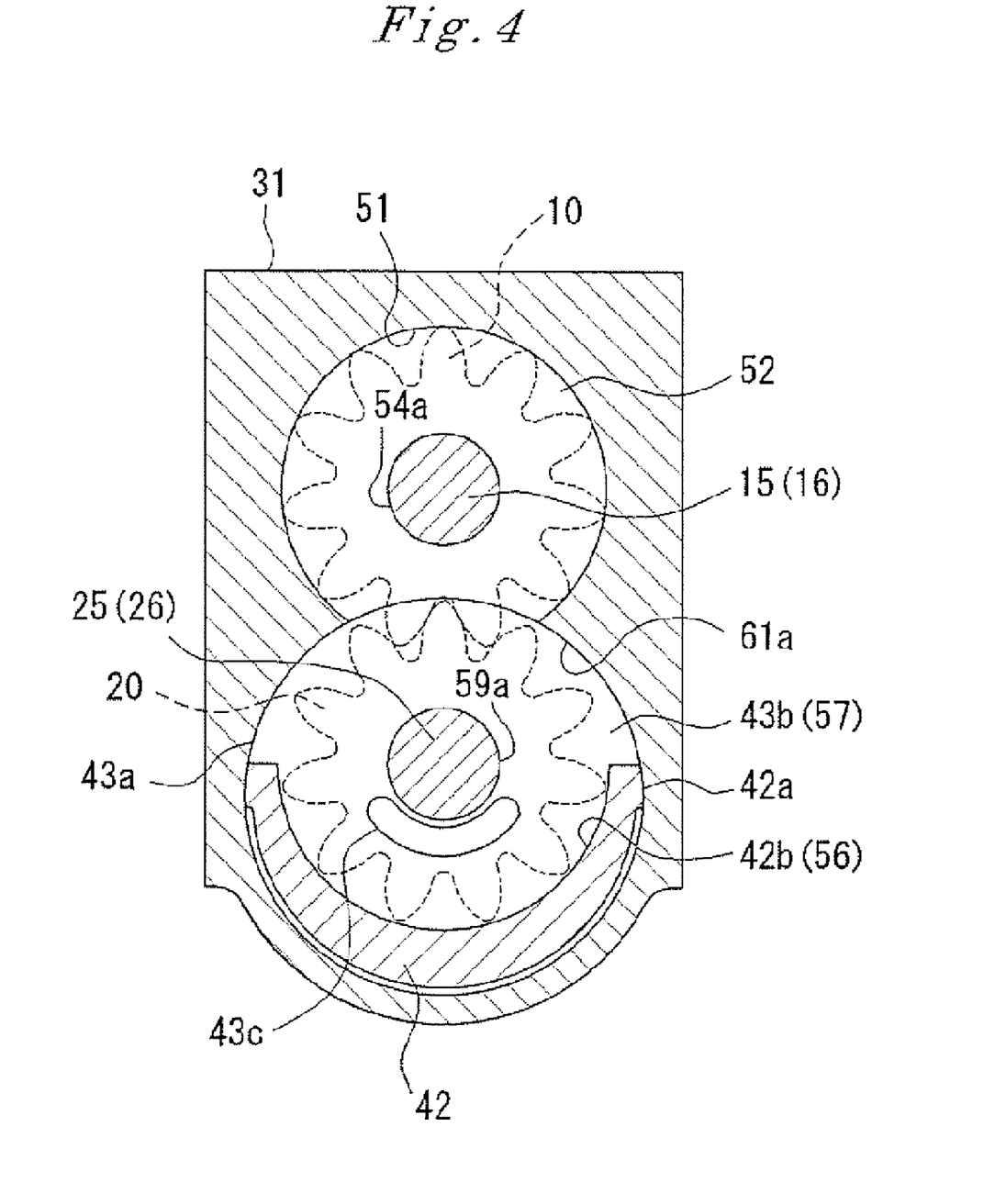
FIG. 4 is a cross section diagram of the first embodiment of an oil pump as seen in the direction of arrow IV-IV in FIG. 1 and FIG. 2, showing the back side view of the casing and the gear holder.

The oil pump 1 is an external mesh type gear pump comprising a drive gear 10 and a driven gear 20 which rotate around the center of parallel rotation axes and are externally engaged, and a casing 2 with a pump chamber 5 for housing the drive gear 10 and the driven gear 20 such that the tooth tips and both side surfaces can slide.

The drive gear 10 is supported on a drive side support shaft 15 which is rotationally driven by a rotational drive force from the engine output shaft through a transfer gear 9 and rotates integrally with the drive side support shaft 15. The driven gear 20 rotates relative to a driven side support shaft 25 through a bushing 81 on the driven side support shaft 25 which extends parallel to the drive side support shaft 15. Both gears 10, 20 are flat gears with involuted shaped teeth, and have the same cross-sectional shape.

The casing 2 comprises a main casing 30 having a drive side pump chamber 50 which rotatably supports the drive side support shaft 15 and houses the drive gear 10, and a gear holder 41 located in the main casing 30 in a manner which can freely slide in the axial direction into a housing space 60 which extends into the bottom section of the drive side pump chamber 50 in parallel to the axis of the drive side support shaft 15 and which has a driven side pump chamber 55 which supports the driven side support shaft 25 and houses the driven gear 20. The drive side pump chamber 50 and the driven side pump chamber 55 are vertically connected to form the pump chamber 5.

The drive side pump chamber 50 is enclosed and formed by a drive side internal circumferential surface 51 against which the tooth tips 11 of the drive gear 10 slide, a drive side first side surface 52 against which one side surface 12 of the drive gear 10 slides, and a drive side second side surface 53 against which the other side surface 13 of the drive gear 10 slides. The driven side pump chamber 55 is enclosed and formed by a driven side inner circumferential surface 56 against which the tooth tips 21 of the driven gear 20 slide, a driven side first side surface 57 against which the first side surface 22 of the driven gear 20 slides, and a driven side second side surface 58 against which the other side surface 23 of the driven gear 20 slides. Note that the drive side pump chamber 50 is opened in the bottom region to vertically connect to the housing space 60, and the driven side pump chamber 55 is also partially opened in the outer circumference direction. If the gear holder 41 which houses the driven gear 20 is located in the main casing 30, the opening of the driven side pump chamber 55 will face upwards and the drive gear 10 and driven gear 20 will mesh externally in a vertical arrangement.

An intake port 3 and a discharge port 4 which are connected to the pump chamber 5 are formed in the main casing 30. The intake port 3 is connected to the outside through an intake opening 3a which is connected to a tank, and the discharge port 4 is connected to the outside through a discharge opening 4a which is connected to the lubricating oil channel.

With an oil pump 1 of this construction, when both gears 10, 20 rotate, the oil which is drawn from the tank into the intake port 3 will enter the tooth grooves and be transported to the discharge port 4 by rotational movement and pressurized into the lubrication oil channel.

Note that the main casing 30 is assembled by covering the base end surface 31a of a case 31 by the leading end surface 32a of a cover 32, and then connecting the case 31 and the cover 32 together. A cylinder with floor shaped space which opens to the base end surface 31a is formed in the upper part of the case 31 and the drive side pump chamber 50 is formed by attaching the cover 32 to the case 31 and enclosing this cylindrical space in the axial direction. In other words, the inner circumferential surface of this cylindrical space is the drive side inner cylindrical surface 51, the bottom surface of the cylindrical space is the drive side first side surface 52, and the leading end surface 32a of the cover 32 is the drive side second side surface 53.

In the drive side pump chamber 50, a drive side support hole 54 for supporting the drive side support shaft 15 is connected to this shaft, the leading end part 16 of the drive side support shaft 15 is supported by the drive side support hole 54a on the case 31 side where the drive side first side surface 52 is opened, while the base end part 17 is supported by the drive side support hole 54b on the cover 32 side where the drive side second side surface 53 is opened. Thereby, the drive gear can be housed in a condition where movement in the axial direction into the drive side pump chamber 50 is restricted. Furthermore, the drive side support hole 54b on the cover 32 side is formed to pass through the cover 32, and the base end part 17 of the drive side support shaft 15 protrudes to the outside of the cover 32. A transfer gear 9 is attached to this protruding part 17a.

The housing space 60 where the gear holder 41 is located is formed by connecting the cylinder with floor shaped case side space 61 formed on the case 31 side and which opens in the base end surface 31a of the case 31, and a cover side space 62 with a substantially circular ring shaped cross-section is formed in the cover 32 side and opens in the leading end surface 32a of the cover 32. The inner circumferential surface 61a of the case side space 61 and the outer side inner circumferential surface 62a of the cover side space 62 have the same diameter and the center axes are aligned together when assembling the case 31 and the cover 32. The case side space 61 extends in parallel to the cylindrical space of the drive side pump chamber 50, has an axial length which is longer than the cylindrical space, connects vertically to the cylindrical space, and opens in the bottom end part of the drive side pump chamber 50. Therefore, the bottom end part of the drive side first side surface 52 which forms the drive side pump chamber 50 is curved on the top to match the inner circumferential surface 61a of the case side space 61.

Furthermore, in the case 31, an oil space is formed to connect the drive side pump chamber 50 and the case side space 61 which extends left and right with regards to the drive side pump chamber 50 and the case side space 61, and the intake port 3 and the discharge port 4 are formed by enclosing the oil spaces in the axial direction by attaching the cover 32 to the case 31.

The gear holder 41 comprises a storage part 42 with a semicircle ring shaped cross-section which has an inner circumferential surface 42b against which the tooth tips 21 of the driven gear 20 slide, and a cylindrical part 43 which is integrally connected to the base end side in the axial direction of the storage part 42. The outer circumferential surface 42a of this storage part 42 and the outer circumferential surface 43a of the cylindrical part 43 are concentric and have the same diameter, and form an integrated outer circumferential surface 41a in the axial direction. With regards to a gear holder 41 which has this construction, the driven side support shaft 25 is supported by the leading end part 26 by being press fit into the driven side support hole 59a which is opened in the base end surface 43b of the cylindrical part 43, and the driven gear 20 is attached such that one side surface 22 is facing toward and in proximity to the base end surface 43b of the cylindrical part 43, and the tooth tips 21 are facing towards and in proximity to the inner circumferential surface 42a of the storage part 42. Note that a local U-shaped recess 43c is formed in the base end surface 43b of the cylindrical part 43 so as to circumscribe the opening of the driven side support hole 59a, and in the assembled condition, excluding the teeth, the region of the one side surface 22 of the driven gear 20 is facing the recess 43c. The axial length of the storage part 42 is nearly equal to the axial length of the driven gear 20, and when the driven gear 20 is assembled to the gear holder 41, all of the tooth tips 21 will face and be in proximity to the inner circumferential surface 42b of the storage part 42 in the tooth width direction (axial direction), and the other side surface 23 of the driven gear 20 and the base end surface 42c of the storage part 42 will form essentially the same flat surface. Therefore, the gear holder 41 houses the driven gear 20 in the inner side region of the storage part 42, the inner circumferential surface 42b of the storage part 42 is the driven side inner circumferential surface 56 of the driven side pump chamber 55, and the base end surface 43b of the cylindrical part 43 is the driven side first side surface 57 of the driven side pump chamber 55.

The gear holder 41 which supports the leading end part 26 of the driven side support shaft 25 and stores the driven gear 20 fits into and is housed in the case side space 61 from the leading end surface 43d of the cylindrical part 43, and is able to slide freely in the axial direction in the case side space 61. A cylinder with bottom shaped spring chamber 43e which is open at the leading end surface 43d is formed in the cylindrical part 43, and the gear holder 41 is housed in the case side space 61 with a return spring 70 housed in the spring chamber 43e. One end 71 of the return spring 70 is in contact with the bottom surface 43f of the spring chamber 43e, while the other end 72 is in contact with the bottom surface 61b of the case side 61, such that the return spring 70 is located in the axial direction leading end side space 64 with regards to the gear holder 41 in the case side space 61. A biasing force to the axial direction base end side is applied to the bottom surface 43f of the spring chamber 43e by the return spring 70.

Furthermore, a piston 45 is located in the base end side of the gear holder 41 in the storage space 60. The piston 45 is formed as a cylinder with floor, and has a side wall part 47 which forms a cylindrical inner circumferential surface 47b and a bottom wall part 46 which consists of an inner and outer bottom surface 46b, 46c. Furthermore, the outer circumferential surface 46a of the bottom wall part 46 and the outer circumferential surface 47a of the side wall part 47 are connected in the axial direction and integrally form an outer circumferential surface 45a. The piston 45 is fit into the cover side space 62 which has an essentially round ring shaped cross section in a manner which can freely slide. As described above, the inner circumferential surface 61a of the cover side space 61 and the outer side inner circumferential surface 62b of the cover side space 62 are concentric and have the same diameter, and the piston 45 moves in the axial direction in the case side space 61 because the outer circumferential surface 45a slides against the inner circumferential surface 61a of the case side space 61.

Figure 5:
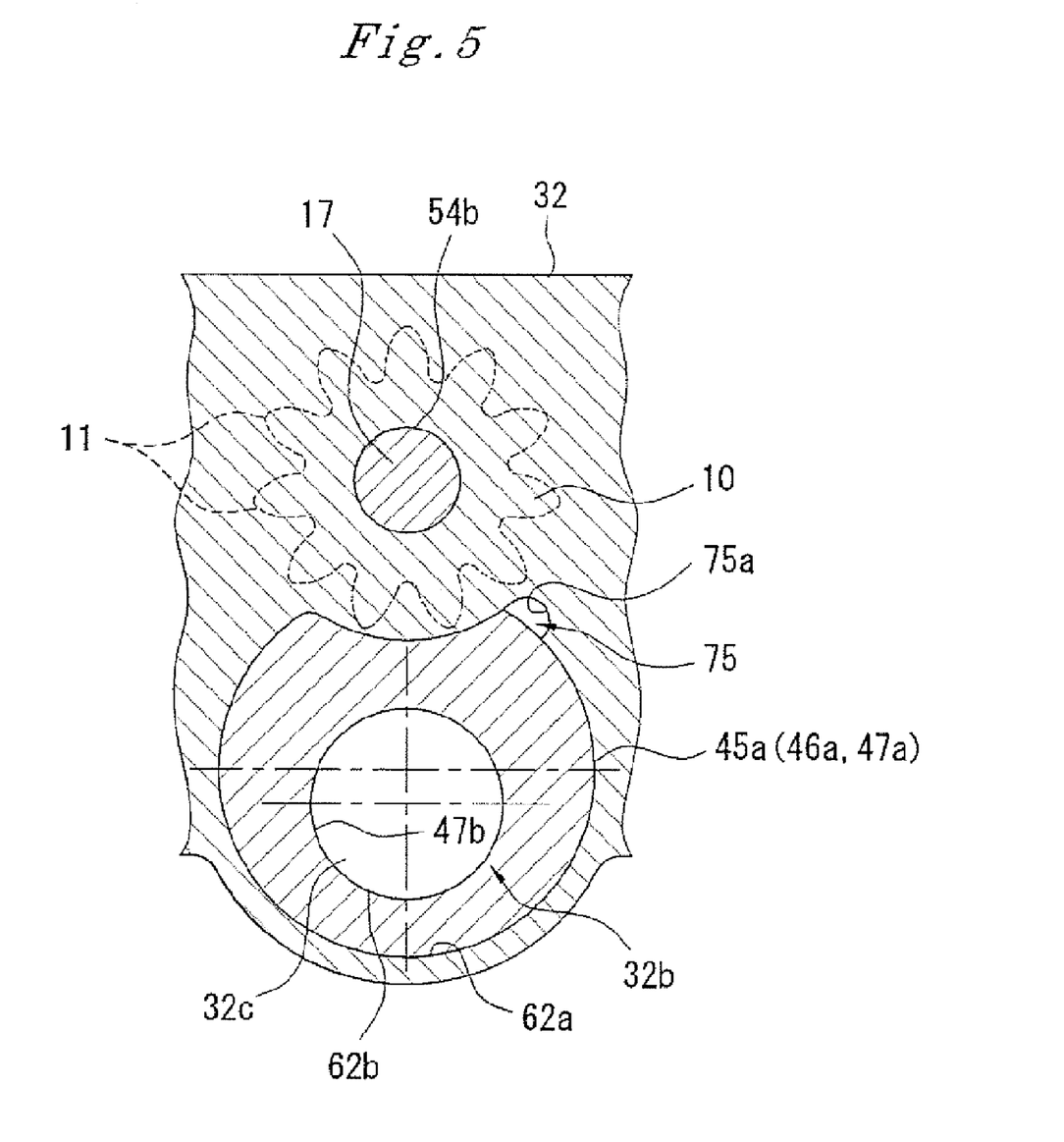
FIG. 5 is a cross section diagram of the first embodiment of an oil pump as seen in the direction of arrow V-V in FIG. 1 and FIG. 2, showing the cross-section view of the cover and the piston.

Note that the cover 32 has a cylindrical region 32b which is surrounded by the inside inner circumferential surface 62b of the cover side space 62 which is formed with an essentially cylindrical ring shaped cross-section, and the side wall part 47 of the piston 45 is fit into this cylindrical part 32b. As shown in FIG. 5, the center of the inner circumferential surface 47b of the side wall part 47 of the piston 45 is eccentric with regards to the center of the outer circumferential surface 47a of the side wall part 47. Furthermore, the upper end region of the outer circumferential surface 45a of the piston 45 and the outside inner circumferential surface 62a of the cover side space 62 are curved downward to match the tooth tip circle of the drive gear 10. Therefore, the center of the outer circumferential surface 47a and the center of the inner circumferential surface 47b of the side wall part 47 are eccentric, and the upper end part of the outer circumferential surface 47a is curved downward, so the position of the piston 45 is fixed in the circumferential direction and the piston 45 is fitted into the cover side space 62, and therefore rotation is restricted.

A driven side support hole 59b is formed in the outer bottom surface 46b in the bottom wall part 46 of the piston 45, and the base end part 27 of the driven side support shaft 25 is press fit into the driven side support hole 59b on the piston 45 side. With the driven side support shaft 25 supported by the piston 45, the outer bottom surface 46b of the piston 45 will contact the base end surface 42c of the storage part 42 of the gear holder 41, and will face towards and be in proximity to the other side surface 23 of the driven gear 20. Therefore, the driven side support shaft 25 will be supported by the piston 45 and the gear holder 41, and will be in contact with the piston 45 and the gear holder 41, so the driven side pump chamber 55 will be an enclosed space in the axial direction, and the outer bottom surface 46b of the piston 45 will be the driven side second side surface 58 of the driven side pump chamber 55.

Note that the outer bottom surface 46b of the piston 45 and the base end surface 42c of the storage part 42 of the gear holder 41 are in contact with the position fixed in the circumferential direction by knock pins 82. Therefore, the driven side support holes 59a, 59b on the piston 45 side and the gear holder 41 side are axially aligned and the position of the gear holder 41 is fixed in the circumferential direction with regards to the case side space 61 by the piston 45 which has good position determined with regards to the cover side space 62. Because the position is fixed, the outer circumferential surface 42b of the storage part 42 will slide against the bottom part of the inner circumferential surface 61a of the case side space 61, and the tooth tips 21 of the driven gear 20 which is housed in the driven side pump chamber 55 will be exposed at the top. Therefore, the drive gear 10 which is stored in the drive side pump chamber 50 and the driven gear 20 which is stored in the main casing 30 in this manner will be externally engaged in the vertical direction.

Because the piston 45 is in contact with the gear holder 41, a biasing force to the axial direction base end side will be applied to the gear holder 41, and the piston 45 will also be biased to the axial direction base end side. The piston 45 which is biased to the axial direction base end side will be restricted from moving toward the base end side together with the gear holder 41 because the inner bottom surface 46c of the bottom wall part 46 will contact with the end surface 32c of the cylindrical part 32b. Furthermore, in this condition, the outer bottom surface 46b of the piston 45 and the leading end surface 32a of the cover 32 are on the same plane, and both gears 10, 20 will engage along the entire width of the teeth without mutually shifting in the axial direction. Hereinafter the width of engagement between the drive gear 10 and the driven gear 20 will be referred to as $\delta$ and the maximum engagement width will be referred to as $\delta_M$, and the condition where both gears 10, 20 are engaged at the maximum engagement width $\delta_M$ will be referred to as the initial condition.

Note that the cover side space 62 is a noncontiguous space which has a bottom surface 62c on the base end side, and an enclosed space 65 is formed on the axial direction base end side of the piston 45 in the cover side space 62. Furthermore, the cover 32 has an internal channel 75 which is connected to the discharge port 4 and the enclosed space 65. This internal channel 75 is enclosed and formed by the inner circumferential surface 75a of a groove formed by cutting the outside surface inner circumferential surface 62a of the cover side space 62 in the outer circumferential direction, and the outer circumferential surface 45a of the piston 45 which is fitted into the cover side space 62, the groove extends in the axial direction of the cover side space 62, and one end extends to the leading end surface 32a of the cover 32 while the other end extends to the bottom surface 62c of the cover side space 62. One end of the internal channel 75 formed in this manner is opened at the leading end surface 32a of the cover 32, and connected to the discharge port 4, while the other end is connected to the enclosed space 65.

Figure 7:
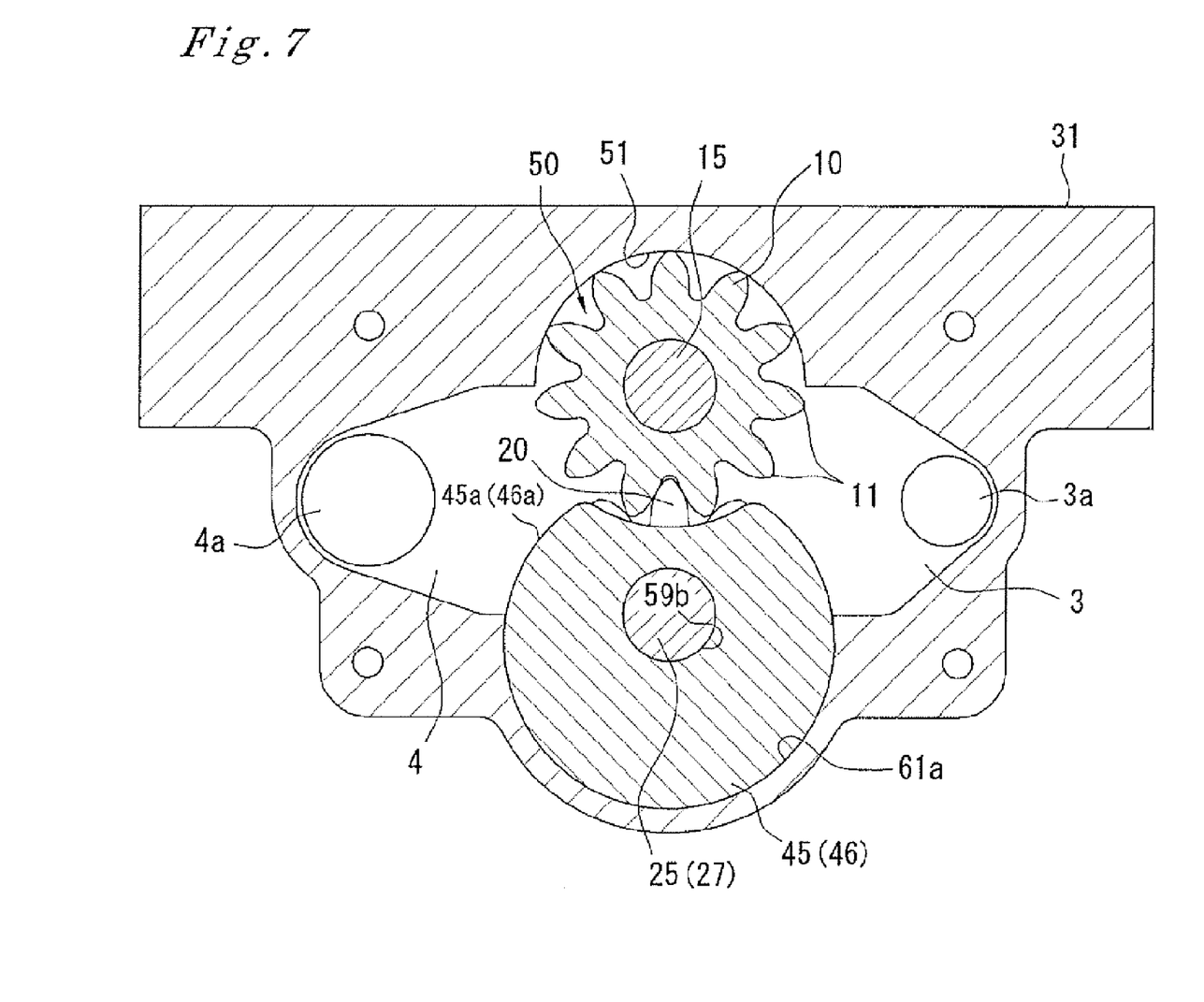
FIG. 7 is a cross section diagram of the first embodiment of an oil pump as seen in the direction of arrow VI-VI in FIG. 6.
Figure 8:
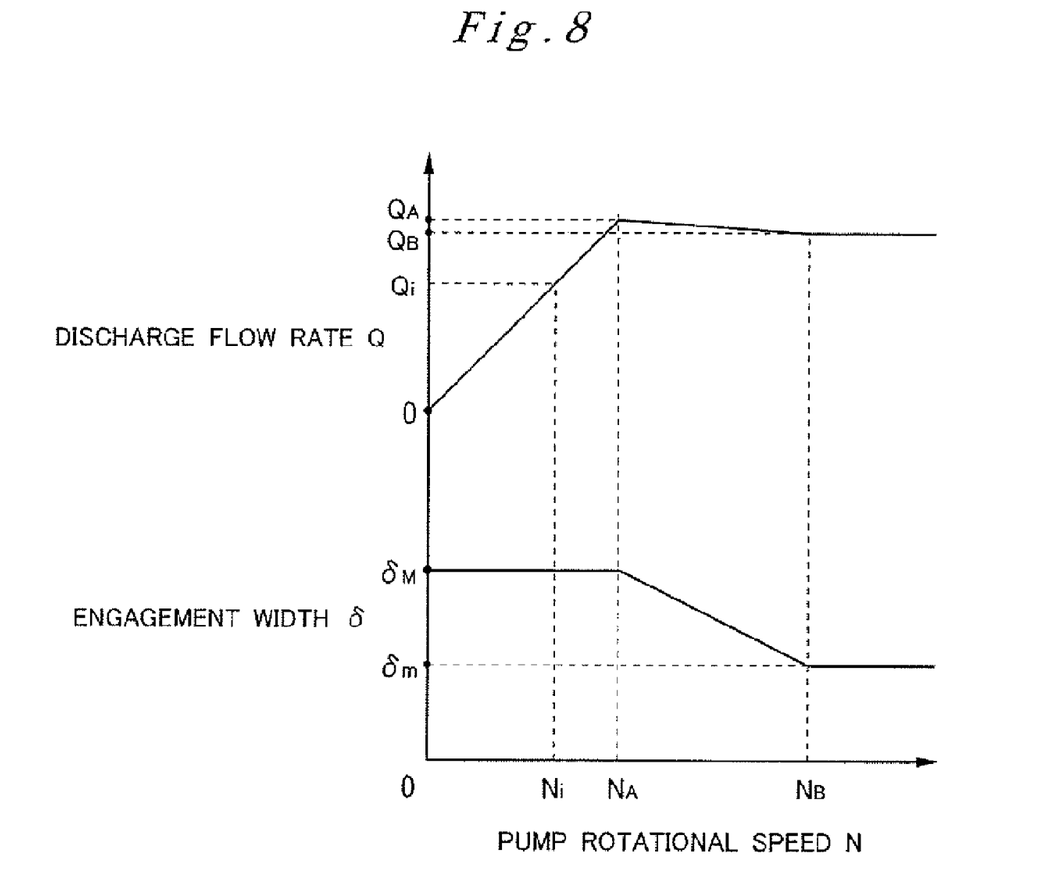
FIG. 8 is a explanatory diagram that describes the function of the first embodiment of an oil pump, showing the relationship between pump rotational speed, discharge flow rate, and gear engagement width.

Next the function of the oil pump 1 will be described while referring to FIG. 6 through FIG. 8. When the engine is stopped, the oil pump 1 is in the initial condition shown in FIG. 3. In the initial condition, a biasing force is applied to the gear holder 41 and the piston 45, but even when this biasing force is applied, the driven side support shaft 25, which is press fit into and supported by the driven side support holes 59a, 59b, will counteract the load based on the biasing force and therefore the condition where the gear holder 41 and piston 45 are supported can be maintained, and the driven side support shaft 25 will move in the axial direction relative to the gear holder 41 and the piston 45 such that the interval set between the side surfaces 22, 23 of the driven gear 20 and the driven side first and second side surfaces 57, 58 will not change.

When the engine is started, the drive side support shaft 15 is made to rotate, both gears 10, 20 are made to rotate, oil accumulated in the tank is drawn into the intake port 3, is transported to the discharge port 4, and pressurized in the lubricating oil channel. Note that the lubricating oil channel is formed in the engine case, and is constructed such that the supplied oil pressure rises with an increase in the amount of oil supplied. Furthermore, FIG. 8 shows the pump rotational speed $N_i$ when the engine is idling, and when the oil pump 1 is started, there is almost no drop in the speed $N_i$, and the discharge flow rate $Q_i$ can ensure that the amount of oil supplied is sufficient for lubrication.

A part of the oil which is discharged to the discharge port 4 is supplied to the enclosed space 65 through the internal channel 75. The oil pressure of the oil which is supplied to the enclosed space 65 acts on the base end surface 47c of the side wall part 47 of the piston 45. Therefore, a pressing force to counteract the biasing force of the return spring 70 is applied to the axial direction leading end side of the piston 45 based on the oil pressure in the enclosed space 65.

When the engine output increases and the pump rotational speed N reaches a first rotational speed $N_A$, the pressing force which acts on the piston 45 will be nearly balanced with the biasing force. Therefore when the pump rotational speed N exceeds the first rotational speed $N_A$, the piston 45 will counteract the biasing force and move together with the gear holder 41 to the axial direction leading end side and the return spring 70 will be compressed. The piston 45 and the gear holder 41 will move to a position where the pressing force is balanced with the biasing force. At this time, as shown in FIG. 7, the leading end part of the piston 45 will be located in the case side space 61 and will overlap vertically with the drive gear 10, but the upper end part is curved downward to match the tooth tip circle, so the drive gear 10 will not interfere with the piston 45.

When the gear holder 41 and the piston 45 move to the axial direction leading end side, the driven gear 20 will move in the axial direction while remaining engaged with the drive gear 10, and therefore the engagement width of the gears 10, 20 will be narrower, and the pump capacity will drop. As shown in FIG. 8, with an oil pump 1 of this embodiment, the discharge flow rate Q will be stable regardless of an increase in the pump rotational speed N as a result of the balance between the increase in the pump rotational speed N and the reduced pump capacity due to the reduced engagement width δ associated with the increase in pump rotational speed N. Therefore, even if the engine output increases, excess oil will not be discharged from the oil pump 1.

Furthermore, a connecting hole 39 is formed in the bottom surface 61b of the case side space 61 in the case 31 to connect the space 64 to the outside, and therefore the space 64 will always maintain atmospheric pressure regardless of the change in volume. Therefore, the gear holder 41 and piston 45 will move smoothly in response to the biasing force and the pressing force. Note that the outer circumferential surface 41a of the gear holder 41 is recessed to the inner circumferential side leaving both end parts as is in the axial direction, and therefore only both end parts in the axial direction will slide against the inner circumferential surface 61a of the case side space 61. Thus the gear holder 41 will have a contact surface area which is smaller than the inner circumferential surface 61a of the case side space 61, so the sliding resistance will be reduced and the gear holder 41 will move smoothly in the storage space 60.

Figure 6:
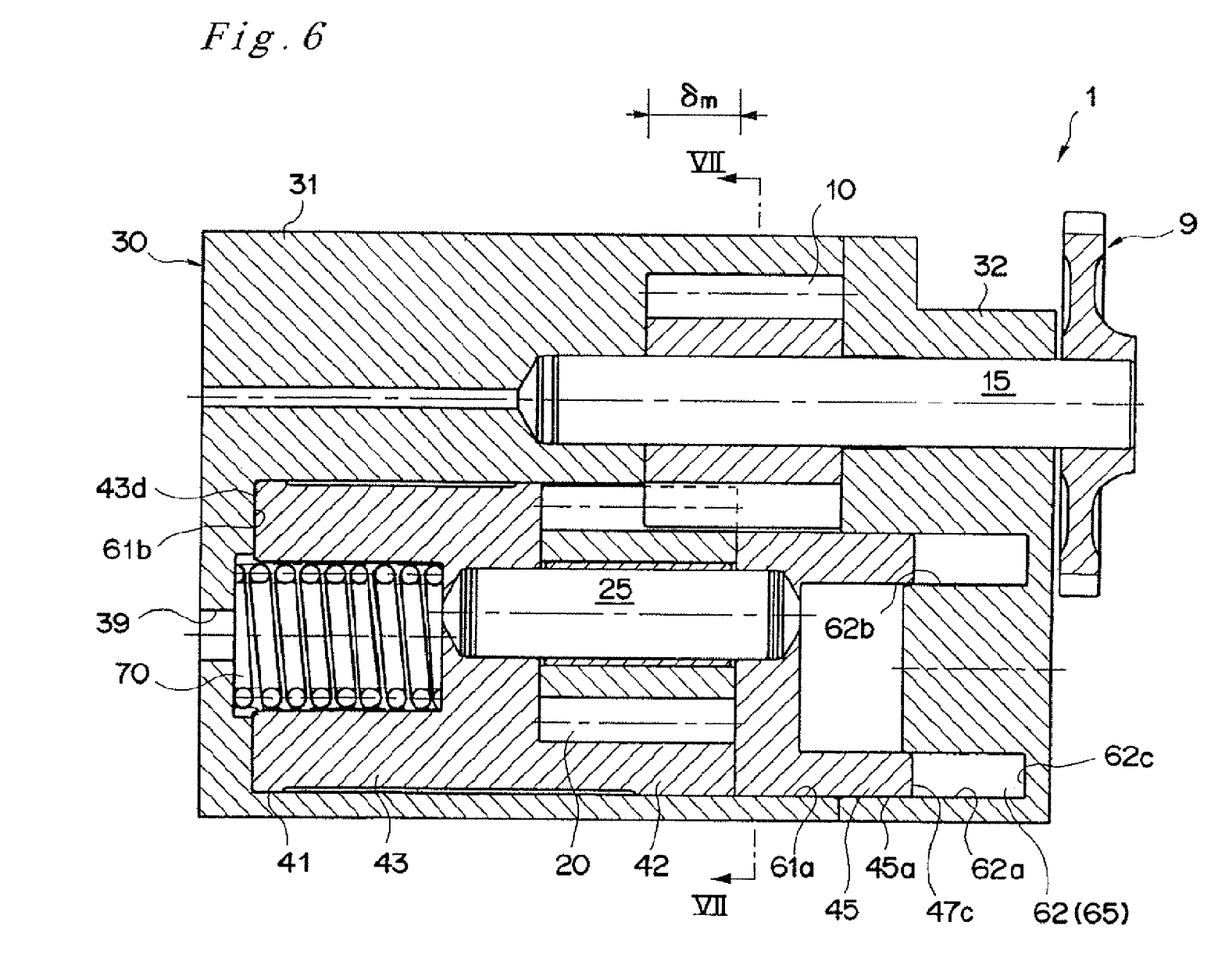
FIG. 6 is a side cross-section diagram of the first embodiment of an oil pump as seen in the direction of arrow A-A in FIG. 1, showing the side cross-section view of the oil pump when the engagement width of the drive gear and the driven gear is at the minimum engagement width.

Furthermore, as shown in FIG. 6, when the pump rotational speed N reaches the second rotational speed $N_B$, the leading end surface 43d of the cylindrical part 43 of the gear holder 41 will contact the bottom surface 61b of the case side space 61. Therefore even though the pump rotational speed N exceeds the second rotational speed $N_B$, the gear holder 41 and the piston 45 will be restricted from moving toward the axial leading end side, and therefore the engagement width $δ_m$ will not be further reduced. Hereinafter, this engagement width $δ_m$ is referred to as the minimum engagement width.

As described above, with the oil pump 1 of this embodiment, the casing 2 which houses the drive gear 10 and the driven gear 20 comprises a main casing 30 which retains the drive gear 10 in a manner which can rotate while movement in the axial direction is restricted, and a gear holder 41 which can move in the rotation axial direction in the main casing 30 while retaining the driven gear 20 in a manner which can rotate. Furthermore, a biasing force to the axial base end side is applied to the gear holder 41 and the pressing force which counteracts the biasing force is applied to the piston 45 which remains in constant contact with the gear holder 41 because of the bias. Thus the gear holder 41 which houses the driven gear 20 is acted upon by both the biasing force and the pressing force.

Therefore, when the pump rotational speed N is between the first rotational speed $N_A$ and the second rotational speed $N_B$, the gear holder 41 and the piston 45 will stop at a prescribed location because of the balance between the pressing force and the biasing force in the storage space 60, but at this time, the biasing force and the pressing force will be canceled out by the contact with the gear holder 41 and the piston 45, so the driven side support shaft 25 will not the acted on by the loading of either the biasing force or the pressing force, and the driven gear 20 will not move in the axial direction within the driven side pump chamber 55.

Note that when the engine is stopped, a biasing force will be applied on the gear holder 41 and the piston 45, but this biasing force will counteract the pressing force when the engagement width δ begins to be reduced from the maximum engagement width $δ_M$, and therefore the driven side support shaft 25 which is supported by the press fit will not be acted upon by a large load, and the driven side support shaft 25 will not move in the axial direction relative to the gear holder 41 and the piston 45. Furthermore, the gear holder 41 and the piston 45 will move in the axial direction as the pressing force increases or decreases, but the driven side support shaft 25 will be supported to counteract the inertial forces which occur due to the acceleration and deceleration when movement is started or before stopping, and therefore the driven side support shaft 25 will not move in the axial direction relative to the gear holder 41 and the piston 45. Furthermore, when the second rotational speed $N_B$ is exceeded and the engagement width δ of the gears 10, 20 is at the minimum engagement width $δ_m$, the gear holder 41 and the piston 45 will be supported by the bottom surface 61b of the case side space 61, and although acted upon by a normal reaction force from the bottom surface 61b equivalent to the difference between the pressing force and the biasing force in the axial direction, the load which is applied by this normal reaction force will not be large, and therefore, similar to as described above, the driven side support shaft 25 will not move in the axial direction relative to the gear holder 41 and the piston 45.

Therefore, the intervals will not change between the driven gear 20, both side surfaces 22, 23 of the driven gear 20, and the driven side first side surface and second side surface 57, 58 of the driven side pump chamber 55, and therefore the sliding resistance can be reduced compared to the conventional form, and the mechanical efficiency of the oil pump 1 can be increased.

Furthermore, with the driven gear 20 housed in the gear holder 41 in a manner which can freely rotate while both side surfaces 22, 23 slide, a surface (driven side second side surface 58) is formed on the piston 45 which faces towards and is in proximity to the side surface of the driven gear 20, and therefore assembly of the driven side support shaft 25 is simplified and the driven gear 20 can easily be housed in the driven side pump chamber 55. Furthermore, a recess 43c is formed in a part of the driven side first side surface 57 which faces towards and is in proximity to one side surface 22 of the driven gear 20, and therefore contact with the one side surface 22 of the driven gear 20 can definitely be prevented in the region where this recess 43c is formed. Therefore, the sliding resistance is reduced and an oil pump 1 with good mechanical efficiency can be provided.

Furthermore, with this embodiment, the base end surface 47c of the piston 45 is pressed by the discharge of oil pressure and creates a pressing force that counteracts the biasing force of the return spring 70 so that the driven gear 2 can be moved in the axial direction. Thereby the pump capacity is variably controlled using the discharge oil pressure, and the discharge flow rate Q can easily be controlled to be stable regardless of the increase or reduction in the pump rotational speed N. Note that in order to perform this variable control, an internal channel 75 is formed to connect the axial base end side and closed space 65 to the discharge port 4 and the piston 45 in the main casing 30. The main casing 30 in which the discharge port 4 is formed has a construction where the base end surface 31a of the case 31 is covered by attaching the cover 32, and the oil space which is opened in the base end surface 31a of the case 31 is covered by the cover 32 to form the discharge port 4. Therefore the internal channel 75 only needs to be formed in the inside of the cover 32, so forming the internal channel 75 can be simplified, which helps eliminate the need for a sealed construction which is required when formed from a plurality of members.

Figure 9:
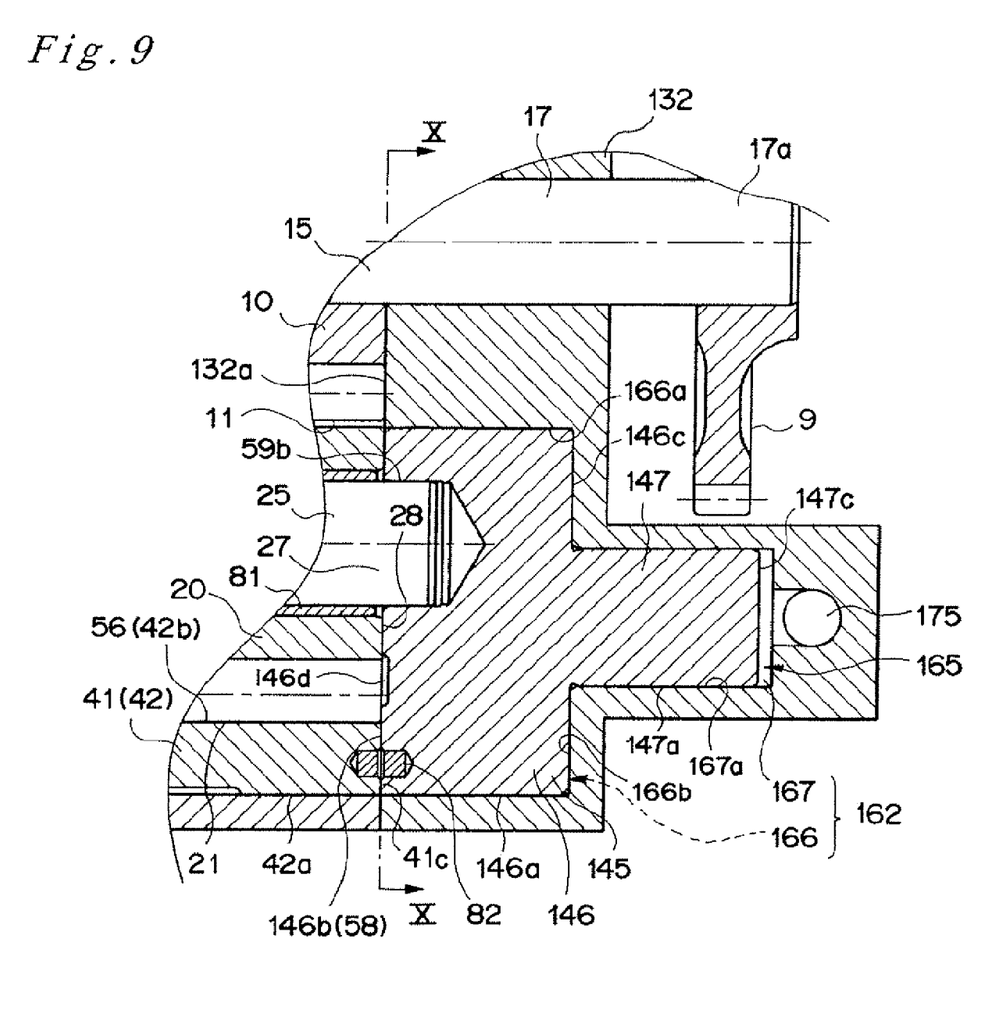
FIG. 9 is a partial side cross section diagram of the second embodiment of an oil pump.
Figure 10:
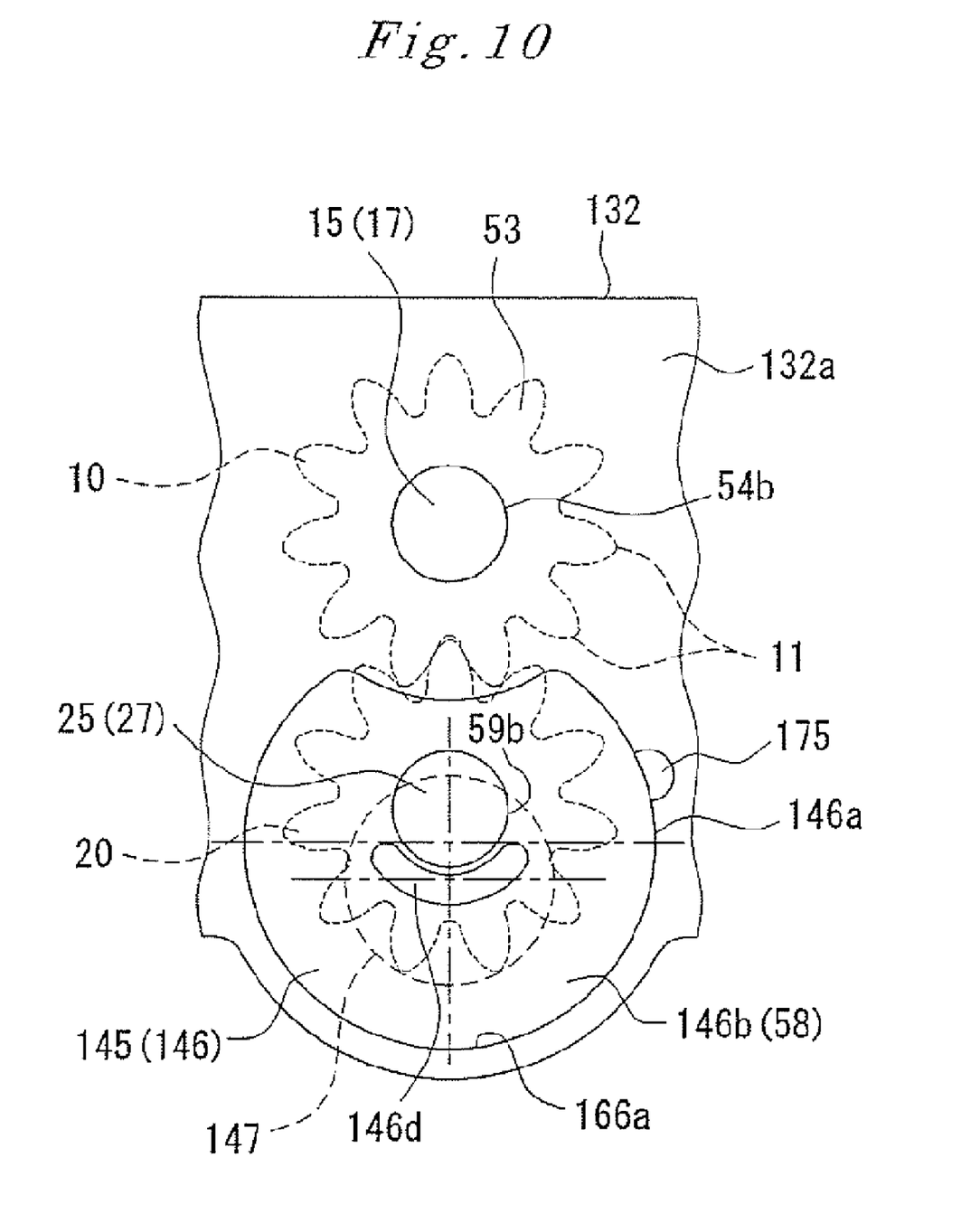
FIG. 10 is a cross section diagram of the second embodiment of an oil pump as seen in the direction of arrow X-X in FIG. 9, showing a front view of the cover and piston.

Next, the second component example of an oil pump 101 will be described while referring to FIG. 9 and FIG. 10. This oil pump 101 has a different shaped piston 145 than the first component example, and therefore same codes are attached and duplicate descriptions are omitted for component members which are identical to the first component example.

The piston 145 integrally has a wall part 146 with an outer circumferential surface 146a with the same shape as seen in the axial direction as the outer circumferential surface 46a of the bottom wall part 46 of the piston 45 from the first embodiment, and a cylindrical protruding part 147 which protrudes to the axial base end side from the center of the base end surface 146c of the wall part 146. A cover side space 162 into which the piston 145 is fitted is formed on the inside of the cover 132, and this cover side space 162 comprises a cylindrical large diameter space 166 which is formed in the leading end surface 132a of the cover 132, and a cylindrical small diameter space 167 which is formed at the center of the bottom surface 166b of the large diameter space 166. The piston 145 is placed in the cover side space 162 by fitting the protruding part 147 into the small diameter space 167 while fitting the wall part 146 into the large diameter space 166. Furthermore, the outer circumferential surface 146a of the wall part 146 is eccentric with regards to the center of the protruding part 147 and the top end part is curved downward. Therefore, the position in the circumferential direction will be fixed when the piston 145 is fitted into the cover side storage space 162, and rotation will be restricted.

Note that the base end surface 42c of the storage part 42 of the gear holder 41 and the leading end surface 142b of the wall part 146 of the piston 145 are held in contact in the storage space 60 by knock pins 82, and therefore the position in the circumferential direction with regards to the cover side space of the gear holder 41 is fixed. In the initial condition, the base end surface 146c of the wall part 146 is in contact with the bottom surface 166b of the large diameter space 166, and the gear holder 41 and the piston 145 are restricted from moving toward the axial base end side. Furthermore, at this time, an enclosed space 165 is formed on the base end side of the protruding part 147 in this small diameter space 167. An internal oil channel 175 which is formed on the inside of the cover 132 connects the enclosed space 165 with the discharge port 4, and guides the discharged oil to the enclosed space 165.

Even if the oil pump 101 operates such that the pump rotational speed N exceeds the first rotational speed $N_A$ so that the piston 145 slides in the axial leading end direction, the piston 145 will not interfere with the drive gear 10 because the top end part of the outer circumferential surface 146a of the wall part 146 is curved downward. Therefore the axial length of the wall part 146 is set to be longer than the slidable distance of the gear holder 41 and the piston 145 (in other words, the difference between the maximum engagement width $\delta_M$ and the minimum engagement width $\delta_m$). Furthermore, the axial length of the protruding part 147 is also set to be longer than the slidable distance in order to prevent the piston 145 from sliding to the axial leading end side and separating from the cover side space 162.

Furthermore, the leading end surface 146b of the piston 145 which is in proximity to and facing the other side surface 23 of the driven gear 20 has a recess 146d similar to the base end surface 43b of the cylindrical part 43 of the gear holder 41 in the aforementioned embodiment. Note that, as shown in FIG. 13, this recess 146d is formed in a location opposite to other side surface 23 of the driven gear 20 excluding the region of the teeth.

This embodiment has a function similar to the first embodiment, and can provide an oil pump 101 which has higher mechanical efficiency without changing the relative interval between the side surfaces 22, 23 of the driven gear 20 and the driven side first and second side surfaces 57, 58 of the driven side pump chamber 55. Furthermore, a recess 146d is also formed in the side of the piston 145 which has the driven side second side surface 58 in order to further reduce sliding resistance.

Note, the axial length of both the wall part 146 and the protruding part 147 must be made longer than the slidable distance in order to prevent the piston 145 of this embodiment from interfering with the drive gear 10, and to prevent the piston 145 from separating from the cover side space 162 when moving to the axial leading end side. On the other hand, with the piston 45 of the first embodiment the outer circumferential surfaces 46a, 47a of the bottom wall part 46 and the side wall part 47 are integrally connected so only the axial length of the side wall part 47 must be longer than the slidable distance, and the axial length of the bottom wall part 46 is set regardless of the slidable distance. Therefore, the piston 45 of the first embodiment allows the oil pump to be more compact in the direction that the piston slides than the second embodiment, or conversely can allow construction of an oil pump with a larger slidable distance and therefore greater variation in pump capacity with the same dimension in the axial direction.

Embodiments of the gear pump of the present invention have been described above, but the present invention is not restricted to the aforementioned constructions. For instance, there is no restriction to double external gear pumps, and the present invention can be applied to triple (tandem) external gear pumps where two driven gears externally mesh with a drive gear, and the same effect can be achieved by housing both or either one of the two driven gears in a gear holder. Note that a form where the drive gear moves in the axial direction is also possible. Furthermore, the power transfer mechanism is not restricted to a gear train, and a chain mechanism or belt mechanism or the like is also acceptable. Furthermore, the present invention is not restricted to oil pumps used for supplying lubricating oil in vehicles, and may also be used for other applications in other devices such as oil pumps which supply operating oil to a hydraulic actuator, or may be applied to pumps for other types of fluids such as air pumps or water pumps or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2006-221581 filed on Aug. 15, 2006, which is incorporated herein by reference.

What is claimed is:

1. A gear pump comprising a first gear and a second gear which are provided rotatably around mutually parallel rotating shafts and which engage with each other, and a casing with housing space to retain said first gear and said second gear in a condition where the tooth tips and both side surfaces slidably contact surfaces within said housing space, said casing being formed with an intake port which draws in oil and a discharge port which discharges oil in conjunction with the rotation of said first gear and said second gear, wherein said casing comprises a main casing which retains said first gear rotatably while restricting movement in the axial direction, and a gear holder which can move in the axial direction of said mutually parallel rotating shafts within said main casing and retains said second gear rotatably, a biasing member which applies a biasing force and biases said gear holder to one side in the axial direction of said mutually parallel rotating shafts, and a piston which is acted on by hydraulic force and presses said gear holder on the other end side in the axial direction of said mutually parallel rotating shafts to counteract said biasing force, are provided in said main casing, and said gear holder is acted on by said hydraulic force from said piston to counteract the bias from said biasing member and moves in the axial direction of said mutually parallel rotating shafts according to said hydraulic force so that the engagement width between said first gear and the second gear retained in said gear holder is changed, wherein said piston is constructed to have a generally disk-shaped flat plate and a protrusion that protrudes in a cylindrical shape from said flat plate and is fitted into said main casing, the center of an outer circumferential surface of said flat plate and the center of an outer circumferential surface of said protrusion are eccentric, and a separate cutout part of the outer circumferential surface of said flat plate is curved to match the tooth tips of said first gear.

2. The gear pump according to claim 1, wherein said gear holder has a first side surface against which one of said two side surfaces of said second gear slides, and an inner circumferential surface against which tooth tips of said second gear slide, said piston has a side surface against which the other side of said two side surfaces of said second gear slide and which contacts said gear holder, and one end of of said rotating shaft which supports said second gear is supported by said piston, and the other end of said rotating shaft is supported by said gear holder.

3. The gear pump according to claim 2, wherein a recess is formed in at least one of said first side surface and said second side surface in a part of the region against which the side surface of said second gear slides.

4. The gear pump according to claim 1, wherein an internal oil channel connecting said discharge port and an enclosed space formed at the back surface side of said piston is formed in said main casing, and said piston is acted on by said hydraulic force from the discharged oil pressure supplied to said enclosed space through said internal oil channel.

* * * * *